(12) United States Patent
Nakade et al.

(10) Patent No.: US 10,240,673 B2
(45) Date of Patent: Mar. 26, 2019

(54) PARKING LOCK CONTROL DEVICE FOR VEHICLE

(71) Applicants: TOYOTA JIDOSHA KABUSHIKI KAISHA, Toyota-shi, Aichi-ken (JP); DENSO CORPORATION, Kariya, Aichi-pref (JP)

(72) Inventors: Yusuke Nakade, Nagoya (JP); Yusaku Kawaguchi, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 15/798,622

(22) Filed: Oct. 31, 2017

(65) Prior Publication Data

US 2018/0149268 A1    May 31, 2018

(30) Foreign Application Priority Data

Nov. 30, 2016 (JP) .................................. 2016-233580

(51) Int. Cl.
*F16H 63/48* (2006.01)
*B60T 1/00* (2006.01)
(Continued)

(52) U.S. Cl.
CPC ............ *F16H 63/483* (2013.01); *B60T 1/005* (2013.01); *B60T 1/062* (2013.01); *B60T 13/746* (2013.01); *B60W 10/182* (2013.01); *F16H 63/3466* (2013.01); *F16H 63/48* (2013.01); *B60T 2210/32* (2013.01); *B60T 2260/04* (2013.01); *F16H 59/66* (2013.01); *F16H 2059/145* (2013.01); *F16H 2059/663* (2013.01)

(58) Field of Classification Search
CPC ............. F16H 63/3466; F16H 63/3475; F16H 63/3458; F16H 63/483; F16H 63/48; F16H 2059/663; F16H 2059/145; F16H 2061/005; F16H 2061/1292; B60T 1/062; B60T 1/005
See application file for complete search history.

(56) References Cited

U.S. PATENT DOCUMENTS 5,807,205 A * 9/1998 Odaka ........................ B60L 7/00
                                                                477/20
7,717,006 B2    5/2010 Kimura et al.
(Continued)

FOREIGN PATENT DOCUMENTS

JP    2008-307996 A    12/2008
JP    2015-183775 A    10/2015

*Primary Examiner* — Erin D Bishop
(74) *Attorney, Agent, or Firm* — Oliff PLC

(57) ABSTRACT

A SBW-ECU includes: a P unreleasable region determination portion configured to determine whether a road surface slope Sr at a vehicle position and an output voltage Volr of an auxiliary battery fall within a predetermined parking lock unreleasable region or not; and a P release request rejection portion configured to reject a P release request in a case where P release request rejection conditions to are all satisfied, including a fact that the P unreleasable region determination portion determines that the road surface slope Sr at the vehicle position and the output voltage Volr of the auxiliary battery fall within the parking lock unreleasable region (the P release request rejection condition (c) is satisfied).

8 Claims, 7 Drawing Sheets

(51) Int. Cl.
  F16H 63/34 (2006.01)
  B60T 1/06 (2006.01)
  B60T 13/74 (2006.01)
  B60W 10/18 (2012.01)
  F16H 59/14 (2006.01)
  F16H 59/66 (2006.01)

(56) References Cited

U.S. PATENT DOCUMENTS

| | | | |
|---|---|---|---|
| 10,086,807 B2 * | 10/2018 | Gottlieb | B60T 7/122 |
| 2009/0000411 A1 * | 1/2009 | Nakayama | F16H 63/3466 74/335 |
| 2017/0138464 A1 | 5/2017 | Shine et al. | |

* cited by examiner

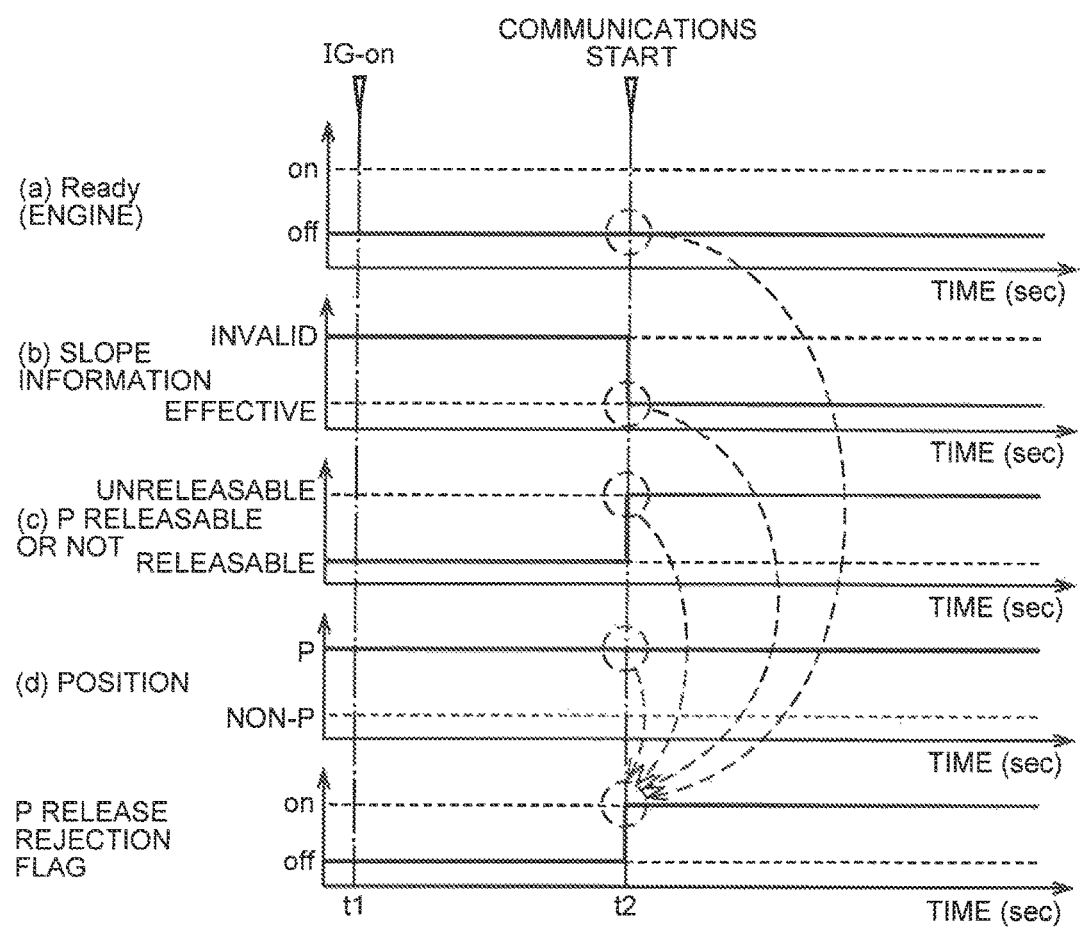

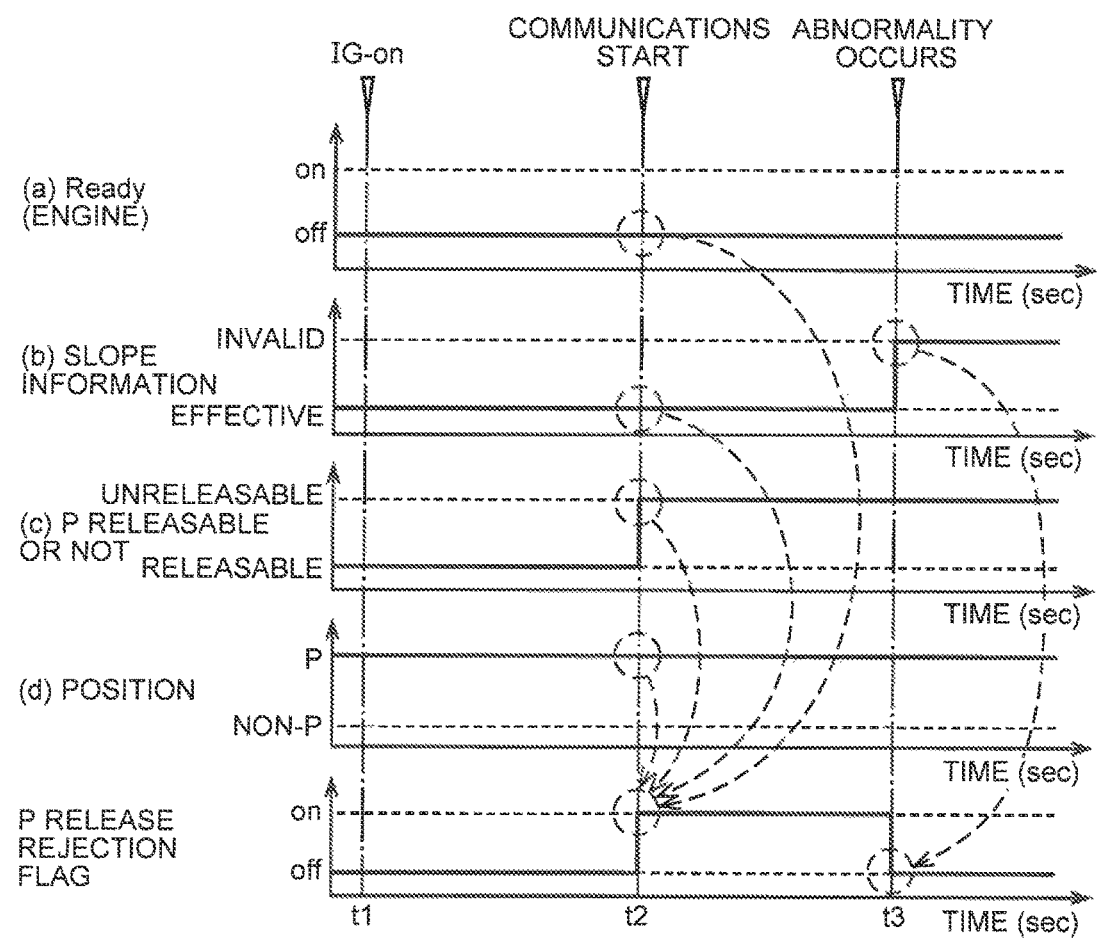

PARKING LOCK CONTROL DEVICE FOR VEHICLE

INCORPORATION BY REFERENCE

The disclosure of Japanese Patent Application No. 2016-233580 filed on Nov. 30, 2016 including the specification, drawings and abstract is incorporated herein by reference in its entirety.

BACKGROUND

1. Technical Field

The present disclosure relates to a parking lock control device for a vehicle for controlling an operation state of a parking lock mechanism driven by an electric actuator, and to a technique to restrain an electric actuator from being wrongly determined to have a failure when an output voltage of a first power supply for supplying an electric power to the electric actuator is in a low voltage state.

2. Description of Related Art

There has been known a parking lock control device for a vehicle, configured such that a parking lock mechanism is changed to a non-parking lock state, by an electric actuator using a first power supply as a power supply, in response to a change request from a parking lock state to the non-parking lock state. For example, Japanese Patent Application Publication No. 2015-183775 (2015-183775 A) discloses such a parking lock control device for a vehicle.

SUMMARY

In the meantime, when an output voltage of the first power supply serving as the power supply for the electric actuator enters a low voltage state, it might be difficult to secure a necessary output torque of the electric actuator to change the parking lock mechanism from the parking lock state to the non-parking lock state, depending on a slope of a road surface. On this occasion, in a case where the change of the parking lock mechanism to the non-parking lock state by the electric actuator is not performed in response to a change request from the parking lock state to the non-parking lock state, even if the electric actuator actually has no failure (hardware failure), a wrong determination (wrong diagnosis) that the electric actuator has a failure might be made by mistake.

The present disclosure restrains an electric actuator from being determined to have a failure by mistake when an output voltage of a first power supply for supplying an electric power to the electric actuator enters a low voltage state.

A summary of the first disclosure is a parking lock control device for a vehicle, the parking lock control device being configured to change a parking lock mechanism to a non-parking lock state by an electric actuator using a first power supply as a power supply, in response to a change request from a parking lock state to the non-parking lock state. The parking lock control device includes: a parking lock unreleasable region determination portion configured to determine whether a road surface slope at a vehicle position and an output voltage of the first power supply fall within a predetermined parking lock unreleasable region or not; and a parking lock release request rejection portion configured to reject the change request when the parking lock unreleasable region determination portion determines that the road surface slope at the vehicle position and the output voltage of the first power supply fall within the parking lock unreleasable region. The parking lock control device can be also defined as the following parking lock control device for a vehicle. That is, the parking lock control device is configured to change a parking lock mechanism to a non-parking lock state by an electric actuator using a first power supply as a power supply, in response to a change request to change a state from a parking lock state to the non-parking lock state, and the parking lock control device includes an electronic control unit configured to determine whether a road surface slope at a vehicle position and an output voltage of the first power supply are within a predetermined parking lock unreleasable region or not, and reject the change request when the electronic control unit determines that the road surface slope at the vehicle position and the output voltage of the first power supply fall within the parking lock unreleasable region.

A summary of a second disclosure is as follows. In the first disclosure, a change request rejection notifying portion is provided, the change request rejection notifying portion being configured to output a notice that the change request has been rejected, in a case where the parking lock unreleasable region determination portion determines that the road surface slope at the vehicle position and the output voltage of the first power supply fall within the parking lock unreleasable region.

A summary of a third disclosure is as follows. In the first disclosure or the second disclosure, in a two-dimensional coordinate including an axis indicative of the output voltage of the first power supply and an axis indicative of the road surface slope, the parking lock unreleasable region is either one of the following regions: a region where the road surface slope is larger than a road surface slope boundary line set so that the road surface slope increases along with an increase of the output voltage of the first power supply, and the output voltage of the first power supply is lower than a voltage boundary line set so that the output voltage of the first power supply indicates a predetermined voltage value; and a region where the output voltage of the first power supply is lower than a voltage slope boundary line set so that the output voltage of the first power supply increases along with an increase of the road surface slope, and the output voltage of the first power supply is lower than the voltage boundary line.

A summary of a fourth disclosure is as follows. In the third disclosure, the first power supply is a first storage battery; the vehicle includes a second storage battery having a voltage higher than the first storage battery and provided as a second power supply, and a DC voltage converter configured to decrease an output voltage of the second storage battery to a charging voltage of the first storage battery in a power state where vehicle running is performable; and a region where the output voltage of the first storage battery is higher than the voltage boundary line is a voltage region of the first storage battery charged with the charging voltage decreased by the DC voltage converter from the output voltage of the second storage battery.

A summary of a fifth disclosure is as follows. In the second disclosure, the first power supply is a first storage battery; the vehicle includes a second storage battery having a voltage higher than the first storage battery and provided as a second power supply, and a DC voltage converter configured to decrease an output voltage of the second storage battery to a charging voltage of the first storage battery in a power state where vehicle running is performable; and the change request rejection notifying portion performs notification to promote changing to the power state where the vehicle running is performable.

A summary of a sixth disclosure is as follows. In the third disclosure, the first power supply is a first storage battery; the vehicle includes a generator rotationally driven by the engine; and a region where the output voltage of the first storage battery is higher than the voltage boundary line is a voltage region of the first storage battery charged by the generator.

A summary of a seventh disclosure is as follows. In the second disclosure, the first power supply is a first storage battery; the vehicle includes a generator rotationally driven by an engine; and the change request rejection notifying portion performs notification to promote starting of the engine.

A summary of an eighth disclosure is as follows. In any one of the first disclosure to the seventh disclosure, road surface slope detecting means configured to detect the road surface slope at the vehicle position is provided. The parking lock release request rejection portion is configured such that, in a case where a road surface slope value detected by the road surface slope detecting means is abnormal or the road surface slope detecting means is abnormal, even if the parking lock unreleasable region determination portion determines that the road surface slope at the vehicle position and the output voltage of the first power supply fall within the parking lock unreleasable region, the parking lock release request rejection portion does not reject the change request.

According to the first disclosure, the following portions are provided: the parking lock unreleasable region determination portion configured to determine whether the road surface slope at the vehicle position and the output voltage of the first power supply fall within the predetermined parking lock unreleasable region or not; and the parking lock release request rejection portion configured to reject the change request when the parking lock unreleasable region determination portion determines that the road surface slope at the vehicle position and the output voltage of the first power supply fall within the parking lock unreleasable region. On this account, when the electric actuator might not be able to output an output torque necessary to set the parking lock mechanism to the non-parking lock state, the change request from a driver to change from the parking lock state to the non-parking lock state is rejected. Hereby, in a power state of the vehicle where the output voltage of the first power supply that supplies an electric power to the electric actuator might enter a low voltage state, it is possible to restrain the electric actuator from being wrongly determined to have a failure.

According to the second disclosure, the change request rejection notifying portion is provided, the change request rejection notifying portion being configured to output the notice that the change request has been rejected, in a case where the parking lock unreleasable region determination portion determines that the road surface slope at the vehicle position and the output voltage of the first power supply fall within the parking lock unreleasable region. Hereby, the driver is notified that, in the power state of the vehicle where the output voltage of the first power supply that supplies an electric power to the electric actuator might enter the low voltage state, the change request to change the parking lock mechanism from the parking lock state to the non-parking lock state has been rejected. Hereby, it is possible to promote the driver to secure the output voltage of the first power supply.

According to the third disclosure, in the two-dimensional coordinate including the axis indicative of the output voltage of the first power supply and the axis indicative of the road surface slope, the parking lock unreleasable region is either one of the following regions: the region where the road surface slope is larger than the road surface slope boundary line set so that the road surface slope increases along with an increase of the output voltage of the first power supply, and the output voltage of the first power supply is lower than a voltage boundary line set so that the output voltage of the first power supply indicates a predetermined voltage value; and the region where the output voltage of the first power supply is lower than a voltage slope boundary line set so that the output voltage of the first power supply increases with an increase of the road surface slope, and the output voltage of the first power supply is lower than the voltage boundary line. On this account, when an actual output voltage of the first storage battery is lower than the predetermined voltage value and an actual road surface slope is larger than a road surface slope determined based on the actual output voltage of the first storage battery from the road surface slope boundary line, the change request from the driver to change from the parking lock state to the non-parking lock state is rejected. Alternatively, when the actual output voltage of the first storage battery is lower than the voltage boundary line set so as to indicate the predetermined voltage value and the actual output voltage of the first storage battery is lower than an output voltage of the first storage battery, determined from the road surface slope at the vehicle position based on the voltage boundary line, the change request from the driver to change from the parking lock state to the non-parking lock state is rejected. Hereby, it is possible to appropriately restrain the electric actuator from being wrongly determined to have a failure in a slope road.

According to the fourth disclosure, the first power supply is the first storage battery, and the vehicle includes: the second storage battery having a voltage higher than the first storage battery and provided as tie second power supply; and the DC voltage converter configured to decrease the output voltage of the second storage battery to the charging voltage for the first storage battery in a power state where vehicle running is performable. The region where the output voltage of the first storage battery is higher than the voltage boundary line is the voltage region of the first storage battery charged with the charging voltage decreased by the DC voltage converter from the output voltage of the second storage battery. On this account, in a power state of the vehicle in which the first storage battery is charged with the charging voltage output from the second storage battery as the second power supply and decreased by the DC voltage converter, the change request from the driver to change from the parking lock state to the non-parking lock state is not rejected.

According to the fifth disclosure, the first power supply is the first storage battery, and the vehicle includes: the second storage battery having a voltage higher than the first storage battery and provided as the second power supply; and the DC voltage converter configured to decrease the output voltage of the second storage battery to the charging voltage for the first storage battery in a power state where the vehicle running is performable. The change request rejection notifying portion performs notification to promote changing to the power state where the vehicle running is performable. On this account, in a case where the change request from the driver to change the parking lock mechanism from the parking lock state to the non-parking lock state is rejected in the power state of the vehicle where the output voltage of the first storage battery that supplies an electric power to the electric actuator might enter the low voltage state, the driver is promoted to perform the changing to the power state where the vehicle running is performable.

According to the sixth disclosure, the first power supply is the first storage battery, the vehicle includes the generator rotationally driven by the engine, and the region where the output voltage of the first storage battery is higher than the voltage boundary line is the voltage region of the first storage battery charged by the generator. On this account, in the power state of the vehicle where the first storage battery is charged by the generator, the change request from the driver to change from the parking lock state to the non-parking lock state is not rejected.

According to the seventh disclosure, the first power supply is the first storage battery, the vehicle includes the generator rotationally driven by the engine, and the change request rejection notifying portion performs notification to promote starting of the engine. On this account, in a case where the change request from the driver to change the parking lock mechanism from the parking lock state to the non-parking lock state is rejected in the power state of the vehicle where the output voltage of the first storage battery that supplies an electric power to the electric actuator might enter the low voltage state, the driver is promoted to perform the staring of the engine.

According to the eighth disclosure, in any one of the first disclosure to the seventh disclosure, the road surface slope detecting means configured to detect the road surface slope at the vehicle position is provided, and the parking lock release request rejection portion is configured such that, in a case where a road surface slope value detected by the road surface slope detecting means is abnormal or the road surface slope detecting means is abnormal, even if the parking lock unreleasable region determination portion determines that the road surface slope at the vehicle position and the output voltage of the first storage battery fall within the parking lock unreleasable region, the parking lock release request rejection portion does not to reject the change request. On this account, such a situation can be restrained that: in a case where the road surface slope value detected by the road surface slope detecting means is abnormal or the road surface slope detecting means is abnormal, when the road surface slope is small and the electric actuator can output an output torque necessary to set the parking lock mechanism to the non-parking lock state, for example, the changing from the parking lock state to the non-parking lock state is wrongly rejected.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a time chart to describe an exemplary operation of a control operation of the SBW-ECU of FIG. 2 when the power state of the vehicle is in the IG-ON state (READY-OFF state); and FIG. 8 is a time chart to describe an exemplary operation of a control operation of the SBW-ECU of FIG. 2 when the power state of the vehicle is in the IG-ON state (READY-OFF state).

DETAILED DESCRIPTION OF EMBODIMENTS

The following describes one embodiment of a parking lock control device for a vehicle of the present disclosure with reference to the drawings.

Figure 1:
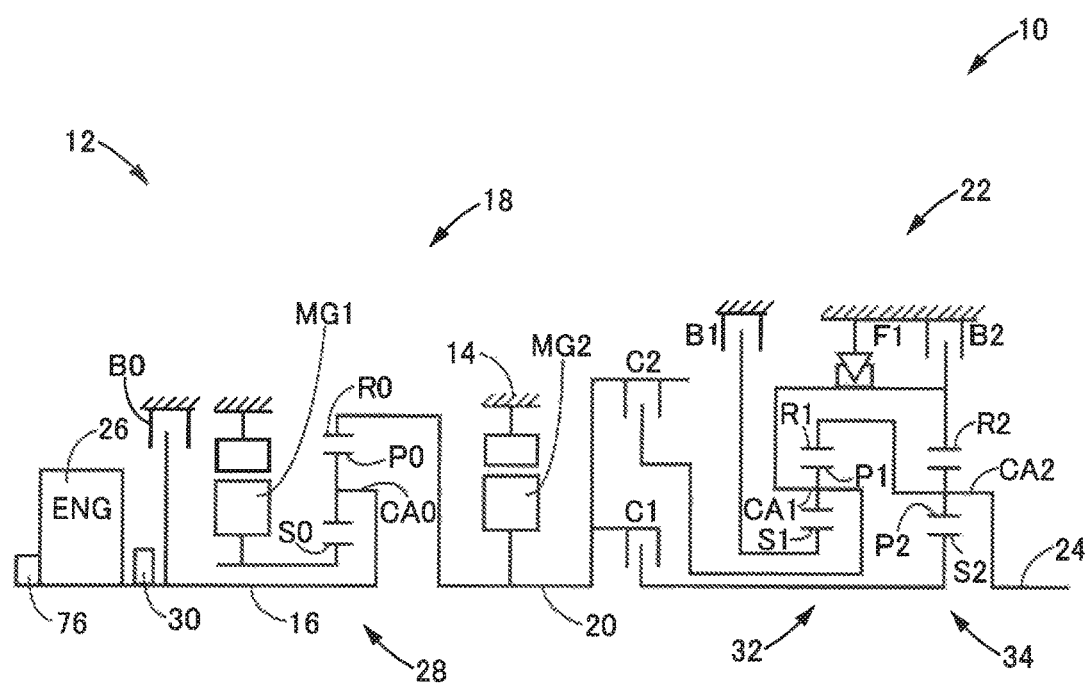
FIG. 1 is an outline view to describe an exemplary configuration of a hybrid-vehicle driving device for a hybrid vehicle to which an electric control unit of the present disclosure is applied.

FIG. 1 is an outline view to describe an exemplary configuration of a hybrid-vehicle driving device 12 provided in a hybrid vehicle 10 to which the present disclosure is preferably applied. As illustrated in FIG. 1, the hybrid-vehicle driving device 12 (hereinafter referred to as a "driving device 12") provided in the hybrid vehicle 10 (hereinafter referred to as a "vehicle 10") of the present embodiment includes, in series, an input shaft 16 disposed on a common axial center in a transmission case 14 (hereinafter referred to as "case 14") serving as a nonrotatable member attached to a vehicle body, a differential portion 18 connected to the input shaft 16 directly or indirectly via a pulse absorbing damper (a vibration damping device) or the like (not shown), an automatic gear shifting portion 22 connected in series to a power transmission path between the differential portion 18 and drive wheels (not shown) via a transmission member (a driving shaft) 20, and an output shaft 24 connected to the automatic gear shifting portion 22. Note that the following deals with an example in which the present disclosure is applied to a hybrid vehicle including an engine 26, a first motor MG1, and a second motor MG2 as driving force sources. However, the vehicle to which the present disclosure is applied may be any type of vehicle such as a normal engine vehicle (AT vehicle) including only an engine as a driving force source and configured such that a power of the engine is transmitted to driving wheels via an automatic transmission, and an electrically-driven vehicle including only a motor as a driving force source, provided that the vehicles employ a shift-by-wire system.

The driving device 12 is preferably used in a FR (front-engine/rear-drive) vehicle in which the driving device 12 is placed along a longitudinal direction in a hybrid vehicle (hereinafter referred to as a "vehicle"), for example, and the driving device 12 transmits a power generated by the engine 26 from the output shaft 24 to a pair of driving wheels via a differential gear mechanism (not shown) and an axle (not shown) provided between the differential gear mechanism and the pair of driving wheels. The engine 26 is an internal combustion engine such as a gasoline engine or a diesel engine, for example, as a driving force source for running, the driving force source being connected to the input shaft 16. Note that, in the driving device 12, the engine 26 is directly connected to the input shaft 16. This direct connection indicates that they are connected to each other not via a fluid-type transmission device such as a torque converter or a fluid coupling, and this direct connection includes a connection via the pulse absorbing damper or the like, for example. Further, since the driving device 12 is configured symmetrically with respect to its axial center, so its lower side is omitted in the outline view of FIG. 1. The same can be said for each of the following embodiments.

The differential portion 18 includes: the first motor MG1; a power distribution device 28 which serves as a mechanical mechanism for mechanically distributing an output of the engine 26, input into the input shaft 16, and which serves as a differential mechanism for distributing the output of the engine 26 between the first motor MG1 and a transmission member 20; and the second motor MG2 operatively connected to the transmission member 20 so as to rotate integrally therewith. The first motor MG1 and the second motor MG2 provided in the driving device 12 of the present embodiment are each constituted by a three-phase alternating current synchronous motor including a stator around which a three-phase coil is wound and a rotator provided with a permanent magnet. The first motor MG1 and the second motor MG2 each function as a so-called motor generator functioning as a motor and a generator. The differential portion 18 functions as an electric differential portion configured such that its operational state is controlled via the first motor MG1 and the second motor MG2, so that a differential state of an input rotation speed (a rotation speed of the input shaft 16) and an output rotation speed (a rotation speed of the transmission member 20) is controlled.

The power distribution device 28 is mainly constituted by a single-pinion planetary gear. The power distribution device 28 includes, as rotating elements (elements), a sun gear S0, a planet gear P0, a carrier CA0 for supporting the planet gear P0 in a spinning and revolving manner, and a ring gear R0 meshing with the sun gear S0 via the planet gear P0. The carrier CA0 is connected to the input shaft 16, namely, the engine 26, the sun gear S0 is connected to the first motor MG1, and the ring gear R0 is connected to the transmission member 20. Further, the input shaft 16 to which the engine 26 is connected is selectively connected, via a brake B0, to the case 14, which is a nonrotatable member. Further, a mechanical hydraulic pump 30 is connected to the input shaft 16.

The automatic gear shifting portion 22 is a planetary-gear type multistage transmission mainly constituted by a single-pinion planetary gear 32 and a single-pinion planetary gear 34 in the power transmission path between the differential portion 18 and the driving wheels (not shown) and functioning as a stepped automatic transmission. The planetary gears 32, 34 each include a sun gear S1, S2, a planet gear P1, P2, a carrier CA1, CA2 for supporting the planet gear P1, P2 in a spinning and revolving manner, and a ring gear R1, R2 meshing with the sun gear S1, S2 via the planet gear P1, P2.

Further, the automatic gear shifting portion 22 is configured such that the sun gear S1 is selectively connected to the case 14 via a brake B1. Further, the carrier CA1 and the ring gear R2 are connected integrally, so as to be selectively connected to the case 14 via a second brake B2, and a rotation thereof in one direction relative to the case 14 is allowed via a one-way clutch F1 while a rotation thereof in a reverse direction is prevented. Further, the sun gear S2 is selectively connected to the transmission member 20 via a first clutch C1. Further, the carrier CA1 and the ring gear R2 thus connected integrally are selectively connected to the transmission member 20 via a second clutch C2. Further, the ring gear R1 and the carrier CA2 are connected integrally, so as to be connected to the output shaft 24. Further, although not illustrated in FIG. 1, a parking gear 78 of a shift change mechanism 40 is connected to the output shaft 24 fixedly.

In the automatic gear shifting portion 22, a first gear stage is established by engagement between the first clutch C1 and the second brake B2, a second gear stage is established by engagement between the first clutch C1 and the first brake B1, a third gear stage is established by engagement between the first clutch C1 and the second clutch C2, a fourth gear stage is established by engagement between the second clutch C2 and the first brake B1, and a reverse gear stage (a reverse shift stage) is established by engagement between the first clutch C1 and the second brake B2. Further, in the automatic gear shifting portion 22, a neutral "N" state is established when the first clutch C1, the second clutch C2, the first brake B1, and the second brake B2 are all released, for example. The differential portion 18 is configured such that, when the brake B0 is engaged, a state where the pair of driving wheels can be driven by both the first motor MG1 and the second motor MG2, that is, a double-driving state is established. When the automatic gear shifting portion 22 enters a power transmittable state, the vehicle 10 performs motor running.

Figure 2:
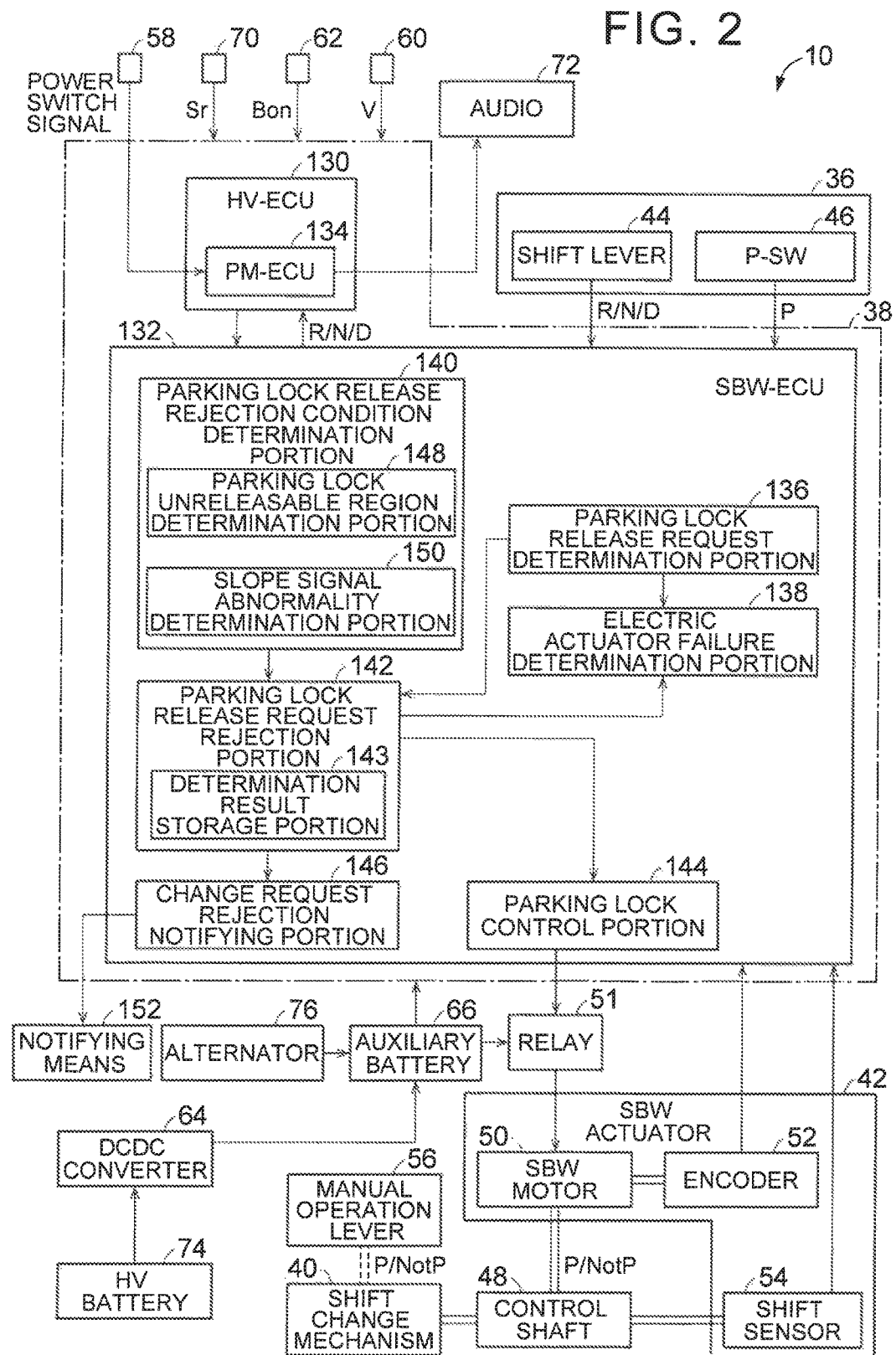
FIG. 2 is a view to describe an essential part of a control system configured to control an operation of a shift change mechanism provided in the hybrid vehicle of FIG. 1, and illustrates an essential part of a control function of the electronic control unit included in the control system as a functional block diagram.

FIG. 2 is a view to describe an essential part of a control system provided in the vehicle 10 so as to control the shift change mechanism 40, and also illustrates an essential part of a control function of an electronic control unit 38 included in the control system as a functional block diagram. In FIG. 2, the vehicle 10 includes a shift operation device 36, the shift change mechanism 40, a SBW actuator 42, the electronic control unit 38, and the like, and employs a shift-by-wire (SBW) system in which a running mode, i.e., a shift position (shift range) of the automatic gear shifting portion 22 is changed by an electric control.

The shift operation device 36 includes a shift lever 44 which is disposed near a driver seat, for example, and which is a momentary-type shift lever operated to a plurality of operation positions Psh, that is, an automatic return shift lever that automatically returns to an original position (an initial position) when an operation force is released. Further, the shift operation device 36 includes, as another switch near the shift lever 44, a momentary-type P-switch 46 configured to change the running mode from a non-P mode other than a parking mode (P mode) to the P mode. Here, the non-P mode includes a reverse mode (R mode), a neutral mode (N mode), and a drive mode (D mode).

The electronic control unit 38 includes a so-called microcomputer constituted by a CPU, a RAM, a ROM, an input-output interface, and so on, for example. The CPU uses a temporary memory function of the RAM and performs signal processing according to a program stored in the ROM in advance, so as to execute an output control of the engine 26, a speed control, a change control of an operation state of the shift change mechanism 40, i.e., a change control of the running mode using the shift-by-wire system, and the like controls.

Various signals are supplied to the electronic control unit 38. The various signals includes, for example: a shift lever position signal R/N/D corresponding to an operation position $P_{SH}$ of the shift lever 44; a P-switch signal indicative of a switch operation in the P-switch 46 to change the running mode from the non-P mode other than the parking mode (P mode) to the P mode; a signal indicative of relative position information of rotational displacement of a rotor of an electric motor 50 and a rotor rotation number from an encoder 52; a signal indicative of an absolute angle of a control shaft 48 from a shift sensor 54; a power switch signal indicative of a switch operation in a vehicle power switch 58; a wheel speed pulse signal corresponding to a vehicle speed V indicative of a rotation speed $N_W$ of each wheel assembly (driving wheels and coupled driving wheels) from a wheel speed sensor 60 as a rotation speed sensor; a brake operation signal indicative of a brake-on state $B_{ON}$ from a brake switch 62, the brake-on state $B_{ON}$ indicating that a foot brake pedal (not shown) has been operated; a signal indicative of a road surface slope from a slope sensor 70 for detecting the road surface slope; and the like signals. Note that the slope sensor 70 corresponds to road-surface slope detecting means of the present disclosure.

The electronic control unit 38 includes a hybrid control computer 130 (HV-ECU 130) and a shift control computer 132 (SBW-ECU 132). The HV-ECU 130 includes a power supply control computer 134 (PM-ECU 134).

The PM-ECU 134 changes a power state of the vehicle 10 based on the power switch signal from the vehicle power switch 58 operated by a user. Here, in the present embodiment, the power state of the vehicle 10 can be shifted to any of the following states, for example: a power OFF state (ALL-OFF state, IG/ACC-OFF state); a partially power ON state (ACC-ON state, IG-OFF state) where the vehicle running is impossible, but only some functions of the vehicle 10 are performable with a combination meter being turned off; a power ON state (IG-ON state) where the combination meter is turned on and the power supply related to the vehicle running is turned on; and a runnable state (READY-ON state) where the vehicle running is controllable by a hybrid control command signal related to the vehicle running and the vehicle 10 can start moving and run when an accelerator is turned on. To perform only some functions of the vehicle 10 indicates, for example, current application to operate a navigator and an audio 72, current application to a battery power taking socket (not shown), and the like. The IG-ON state is a state where the power ON state is established and functions other than a function to control the vehicle running by the hybrid control command signal are controllable (for example, the running mode can be controlled to change, and the like), but the engine 26 does not start so as not be able to drive the first motor MG1 and the second motor MG2. That is, the IG-ON state is a state where the vehicle 10 cannot start moving and run even if the accelerator is turned on. Note that a READY-OFF state is a power state of the vehicle 10, which is not the READY-ON state, and the ALL-OFF state, the ACC-ON state, and the IG-ON state correspond to it.

For example, in the P mode, when an input of the power switch signal is detected in the brake-on state $B_{ON}$, the PM-ECU 134 changes the power state of the vehicle 10 from any states to the READY-ON state. Further, in the P mode, when the vehicle speed V is less than a predetermined stop vehicle speed V' in the IG-ON state or the READY-ON state and the input of the power switch signal is detected, the PM-ECU 134 changes the power state of the vehicle 10 to the ALL-OFF state. Further, in the P-mode, when the input of the power switch signal is detected in a state that is not the brake-on state $B_{ON}$, the PM-ECU 134 changes the power state of the vehicle 10 in order of the ALL-OFF state, the ACC-ON state, the IG-ON state, the ALL-OFF state, . . . , every time the power switch signal is input. Further, in the non-P mode, when the vehicle speed V is less than the predetermined stop vehicle speed V' in the IG-ON state and an input of the power switch signal is detected, the PM-ECU 134 operates the shift change mechanism 40 to output, to the SBW-ECU 132, an automatic P lock change request signal for automatically setting the running mode to the P mode, and after the P mode is established, the PM-ECU 134 changes the power state of the vehicle 10 to the ALL-OFF state (a series of these operations is referred to as an "automatic P operation"). The predetermined stop vehicle speed V' is, for example, a vehicle-stop determination vehicle speed, which is found experimentally and stored in advance so as to determine a vehicle stop state.

When the power state of the vehicle 10 is the ALL-OFF state or the ACC-ON state, the SBW-ECU 132 is set to a non-starting state, but when the power state of the vehicle 10 is the IG-ON state or the READY-ON state, the SBW-ECU 132 is set to a starting state. The non-starting state of the SBW-ECU 132 is, for example, a state where the power of the SBW-ECU 132 is turned off, and the starting state of SBW-ECU 132 is a state where the power of the SBW-ECU 132 is turned on. During a predetermined time period from a time point when the power state of the vehicle 10 is changed from the ALL-OFF state or the ACC-ON state to the IG-ON state or the READY-ON state to a substantial power-on time of the SBW-ECU 132 at which communications with other control computers start, for example, the SBW-ECU 132 is in an initial standby state, and initial processing of the control computers including the SBW-ECU 132 is performed.

An electric power is supplied to the PM-ECU 134, the HV-ECU 130, and the SBW-ECU 132 from an auxiliary battery 66 constituted by a lead storage battery of 12 V, for example. The electric motor 50 of the after-mentioned SBW actuator 42 uses the auxiliary battery 66 as a power supply, and the electric power is supplied from the auxiliary battery 66 thereto via an electric motor relay 51. The vehicle 10 includes: an alternator 76 rotationally driven by the engine 26; and a DCDC converter 64 configured to decrease an output voltage of a HV battery 74 (e.g., several hundred V, which is higher than a voltage of the auxiliary battery 66) to a charging voltage for the auxiliary battery 66. When the power state of vehicle 10 is the READY-ON state, the auxiliary battery 66 is charged with an electric power generated by the alternator 76 with the power of the engine 26 as a source. Further, when the power state of vehicle 10 is the READY-ON state, that is, a vehicle runnable state, the auxiliary battery 66 is charged with a charging voltage for the auxiliary battery 66, the charging voltage being decreased by the DCDC converter 64 from the output voltage of the HV battery 74. The output voltage of the HV battery 74 is higher than the voltage of the auxiliary battery 66. Note that the auxiliary battery 66 corresponds to a first power supply and a first storage battery of the present disclosure, the HV battery 74 corresponds to a second power supply and a second storage battery of the present disclosure, the alternator 76 corresponds to a generator of the present disclosure, and the DCDC converter 64 corresponds to a DC voltage converter of the present disclosure.

An operation signal indicative of an operation state of the shift operation device 36 is supplied to the SBW-ECU 132. The operation signal of the shift operation device 36 includes: the shift lever position signal R/N/D output from a position sensor so as to correspond to the operation position of the shift lever 44; and a P-switch signal P as a change request to the P mode in response to the switch operation of the parking switch 46 (P-switch (P-SW) 46). The SBW-ECU 132 generates a running mode change control command to change the running mode to the non-P mode (R mode, N mode, D mode) other than the P mode based on the shift lever position signal R/N/D. Further, the SBW-ECU 132 generates a P lock change request signal to change the running mode from the non-P mode to the P mode based on the P-switch signal P. The SBW actuator 42 includes: the electric motor 50 (SBW motor 50) provided so as to rotate the after-mentioned control shaft 48; the encoder 52; and the shift sensor 54 as a contactless hole-type absolute angle sensor. The signal indicative of relative position information of rotational displacement of the rotor of the electric motor 50 and the rotor rotation number is supplied to the SBW-ECU 132 from the encoder 52, and the signal indicative of an absolute angle of the control shaft 48 is supplied to the SBW-ECU 132 from the shift sensor 54. Whether the running mode is the P mode or the non-P mode, that is, whether a change position of the shift change mechanism 40 is in a parking lock state or in a non-parking lock state is determined by the SBW-ECU 132 based on a relative angular displacement of the electric motor 50, detected by the encoder 52, and a rotation angle of the control shaft 48, detected by the shift sensor 54. A signal indicative of the operation state of the shift change mechanism 40 (a signal indicative of whether the running mode is the P mode or the non-P mode), determined by the SBW-ECU 132, is supplied to the HV-ECU 130. In a case where the power state of the vehicle 10 is in the READY-ON state, the brake-on Bon state is established, and the shift change mechanism 40 is in the parking lock state, when the SBW-ECU 132 acquires the shift lever position signal R/N/D, the SBW-ECU 132 acquires a rotation angle (a motor angle) of the electric motor 50 from the encoder 52 in response to a change request (a P release request) from a driver to change the shift change mechanism 40 from the parking lock state to the non-parking lock state, and rotationally drives the electric motor 50. In response to that, the electric motor 50 operated based on a supply voltage Vmr from the auxiliary battery 66 rotates the control shaft 48 to a non-parking position (NotP position) corresponding to the shift lever position signal R/N/D, so as to change the shift change mechanism 40 to the non-parking lock state. Further, if a predetermined condition (e.g., a condition that the vehicle speed V is not more than a P lock permission vehicle speed Vp) is satisfied, the SBW-ECU 132 rotationally drives the electric motor 50 so as to rotationally drive the control shaft 48 to a parking position (P position) in response to the P-switch signal P at the time when the shift change mechanism 40 is in the non-parking lock state, so that the shift change mechanism 40 is set to the parking lock state. Also in a case where the automatic P lock change request signal is acquired from the PM-ECU 134, the SBW-ECU 132 sets the shift change mechanism 40 to the parking lock state. Further, a back-up lever 56 (a manual operation lever 56) is provided. The back-up lever 56 is configured to change the shift change mechanism 40 from the parking lock state to the non-parking lock state (NotP) by a manual operation force. Note that the SBW-ECU 132 corresponds to a parking lock control device for a vehicle of the present disclosure, the shift change mechanism 40 corresponds to a parking lock mechanism of the present disclosure, and the electric motor 50 corresponds to an electric actuator of the present disclosure.

When the power state of the vehicle 10 is changed to the READY-ON state by the PM-ECU 134, the HV-ECU 130 outputs a hybrid control command signal such as an engine output control command signal for the output control of the engine 26, a motor control command signal for the drive control of the first motor MG1 and the second motor MG2, and a speed control command signal for the speed control of the automatic gear shifting portion 22, for example.

Figure 3:
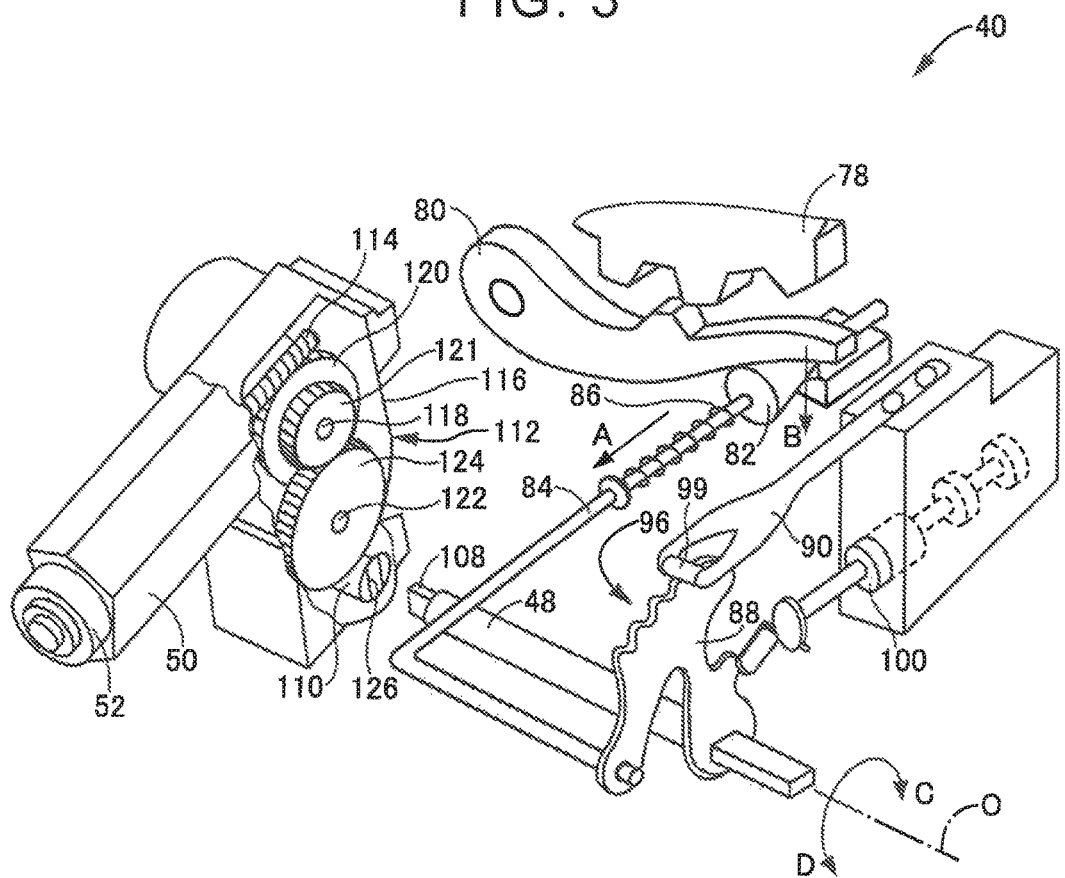
FIG. 3 is a view to describe a configuration of the shift change mechanism provided in the hybrid vehicle of FIG. 1.

FIG. 3 is a view illustrating a configuration of the shift change mechanism 40 provided in the vehicle 10. The shift change mechanism 40 is a running mode change mechanism configured to change the running mode to the P mode, the R mode, the N mode, and the D mode by the electric motor 50 operated based on a supply voltage Vmr from the auxiliary battery 66, in accordance with a command from the SBW-ECU 132 based on the shift lever position signal R/N/D supplied by the operation of the shift lever 44 or the P-switch signal P output from the P-switch 46. Further, the shift change mechanism 40 functions as a parking lock mechanism (P lock mechanism) of the present disclosure, configured to be changed between a parking lock state in which the rotation of the output shaft 24 of the automatic gear shifting portion 22 is mechanically fixed (locked) and a non-parking lock state in which the rotation of the output shaft 24 is unfixed (unlocked).

In FIG. 3, the shift change mechanism 40 includes: the parking gear 78 fixed to the output shaft 24 operatively connected to the driving wheels (not shown); a parking lock pawl 80 provided rotatably to a meshing position where the parking lock pawl 80 meshes with the parking gear 78, so as to selectively lock a rotation of the parking gear 78; a control rod 84 inserted into a tapered cam portion 82 abutting with the parking lock pawl 80 so as to support the tapered cam portion 82 at one end; a spring 86 provided in the control rod 84 so as to bias the tapered earn portion 82 toward its small-diameter direction; a detent lever 88 fixed to the control shaft 48 in a supported manner and connected to the other end of the control rod 84 rotatably so as to be positioned at a parking position and at a non-parking position by a detent mechanism; a detent spring 90 configured to keep the detent lever 88 at any of the parking position and a plurality of non-parking positions while giving moderation to a rotation of the detent lever 88; and a manual valve 100 changed along with the rotation of the detent lever 88. The detent lever 88 supported by the control shaft 48 is rotated around one rotation center line O by driving of the electric motor 50 (SBW motor).

FIG. 3 illustrates a case where the shift change mechanism 40 is in the non-parking lock state. A position of the parking lock pawl 80 is adjusted when the abutment position with the tapered cam portion 82 provided in one end of the control rod 84 is changed. For example, in a case where the tapered cam portion 82 is moved in an arrow-A direction and the parking lock pawl 80 abuts with a small diameter portion of the tapered cam portion 82, the parking lock pawl 80 is disengaged from the parking gear 78 as a tip end of the parking lock pawl 80 is moved toward a vertically lower side (in an arrow-B direction), so that the parking lock state of the shift change mechanism 40 is released (FIG. 3). In the meantime, in a case where the parking lock pawl 80 abuts with a large diameter portion of the tapered cam portion 82, the parking gear 78 is engaged with the parking lock pawl 80, so that the parking lock state (not shown) of the shift change mechanism 40 is established. In a case where the shift change mechanism 40 is in the parking lock state, the parking lock pawl 80 is engaged with the parking gear 78, which prevents the rotation of the parking gear 78 and also prevents the rotation of the driving wheels.

Further, the detent lever 88 includes, at its upper end, a plurality of recessed grooves 96 corresponding to respective rotation positions of the P position and the plurality of non-P positions of the control shaft 48. The detent spring 90 includes an engaging roller 99 rotatably supported by its tip end in a state where the engaging roller 99 is biased so as to engaged with a groove bottom of a corresponding one of the recessed grooves 96 of the detent lever 88. Note that the above description deals with the shift change mechanism 40 provided with the detent lever 88 including the plurality of recessed grooves 96 so as to be changed between the parking lock state and the non-parking lock state, and also functioning as a running mode change mechanism. However, if a shift-by-wire system is employed, the present disclosure may be applied to a vehicle including a parking lock mechanism provided with a detent lever including a P groove corresponding to the parking lock state and a non-P groove corresponding to the non-parking lock state.

The electric motor 50 drives the control shaft 48 via a reduction gear mechanism 112, and the like. A worm gear 114 is formed in an output shaft of the electric motor 50. A worm wheel 120 connected to a shaft 118 rotatably supported by a casing 116 is engaged with the worm gear 114. A small-diameter gear 121 is fixed to the shaft 118. A large-diameter gear 124 formed in an intermediate shaft 122 rotatably supported by the casing 116 is engaged with the small-diameter gear 121. Further, a sector-shaped output gear 110 having meshing teeth formed in a partial arc shape is fitted to a small-diameter gear formed in the intermediate shaft 122. The output gear 110 is rotatably supported by the casing 116, and an engaging hole 126 having a rectangular section is formed in its rotating center. The reduction gear mechanism 112 is constituted by a gear train including the small-diameter gear 121 of the shaft 118, the large-diameter gear 124 of the intermediate shaft 122, the small-diameter gear of the intermediate shaft 122, the output gear 110, and the like. An engageable portion 108 having a rectangular section is formed in a left end in FIG. 3, which is one end of the control shaft 48. The engageable portion 108 of the control shaft 48 is engaged with the engaging hole 126 of the output gear 110.

FIG. 2 illustrates an essential part of a control function of the SBW-ECU 132 at the time when the power state of the vehicle 10 is IG-ON (READY-OFF). The SBW-ECU 132 includes: a parking lock release request determination (means) portion 136 (hereinafter referred to as a "P release request determination portion 136"); an electric actuator failure determination (means) portion 138; a parking lock release rejection condition determination (means) portion 140 (hereinafter referred to as a "P release rejection condition determination (means) portion 140"); a parking lock release request rejection (means) portion 142 (hereinafter referred to as a "P release request rejection (means) portion 142"); a parking lock control (means) portion 144; and a change request rejection notifying (means) portion 146. The P release rejection condition determination portion 140 includes a parking lock unreleasable region determination (means) portion 148 (a P unreleasable region determination (means) portion 148), and a slope signal abnormality determination (means) portion 150. Further, the P release request rejection portion 142 includes a determination result storage (means) portion 143.

In a case where the power state of the vehicle 10 is the IG-ON state (the READY-OFF state), when the shift change mechanism 40 is in the parking lock state, a brake pedal is operated, and a shift lever position signal N based on an operation of the driver to operate the shift lever 44 to the N operation position, for example, is acquired, the P release request determination portion 136 determines a change request (P release request) from the driver to change the shift change mechanism 40 from the parking lock state to the non-parking lock state.

In a case where the power state of the vehicle 10 is the IG-ON state (the READY-OFF state) and the P release request determination portion 136 determines the P release request from the driver, when the shift change mechanism 40 cannot be changed from the parking lock state to the non-parking lock state in response to the P release request, that is, when the P release is not performed, the electric actuator failure determination portion 138 determines that the electric motor 50 has a failure.

In the meantime, in the case where the power state of the vehicle 10 is the IG-ON state, charging of the auxiliary battery 66 is not performed. On that account, an output voltage Volr of the auxiliary battery 66 decreases and a supply voltage Vmr supplied from the auxiliary battery 66 to the electric motor 50 becomes insufficient, which might result in that the electric motor 50 cannot output a torque necessary for the P release depending on a road surface slope. When the power state of the vehicle 10 is the IG-ON stale and the P release request is received, the SBW-ECU 132 rejects (invalidates) the P release request on the condition that the following P release request rejection conditions are established, so as to restrain the electric motor 50 from being wrongly determined to have a failure though the electric motor 50 does not have a hardware failure.

When the power state of the vehicle 10 is changed from the ALL-OFF state or the ACC-ON state to the IG-ON state (the READY-OFF state) and the SBW-ECU 132 is changed from a non-starting state to a starting state, the P release rejection condition determination portion 140 determines whether the P release request rejection conditions (a) to (d), which are conditions to reject the P release request from the driver, are all satisfied or not. The P release request rejection condition (a) is that the power state of the vehicle 10 is the IG-ON state (the READY-OFF state). The P release request rejection condition (b) is that slope information is effective. The P release request rejection condition (c) is that a road surface slope Sr (°) at a vehicle position where the vehicle 10 is positioned and an actual output voltage Volr (V) of the auxiliary battery 66 fall within a predetermined parking lock unreleasable region (hereinafter referred to as a P unreleasable region). The P release request rejection condition (d) is that an operation state of the shift change mechanism 40, determined based on a signal (SBW status signal) detected by the shift sensor 54, is the parking lock state. The P release request rejection condition (b) is determined by the slope signal abnormality determination portion 150. Further, the P release request rejection condition (e) is determined by the P unreleasable region determination portion 148.

In terms of the P release request rejection condition (b), the slope signal abnormality determination portion 150 determines that slope information is not effective, in other words, the slope information is invalid, based on the fact that a road surface slope detected from the slope sensor 70 functioning as the road-surface slope detecting means is abnormal or based on the fact that the slope sensor 70 is abnormal. Further, the slope signal abnormality determination portion 150 determines that the slope information is effective based on the fact that the road surface slope is not abnormal and the slope sensor 70 is not abnormal. Here, that the road surface slope is abnormal indicates, for example, that a road surface slope value shown by a slope signal detected by the slope sensor 70 is abnormal, and that the slope sensor 70 is abnormal indicates, for example, that the slope signal (information) cannot be acquired from the slope sensor 70.

Figure 4:
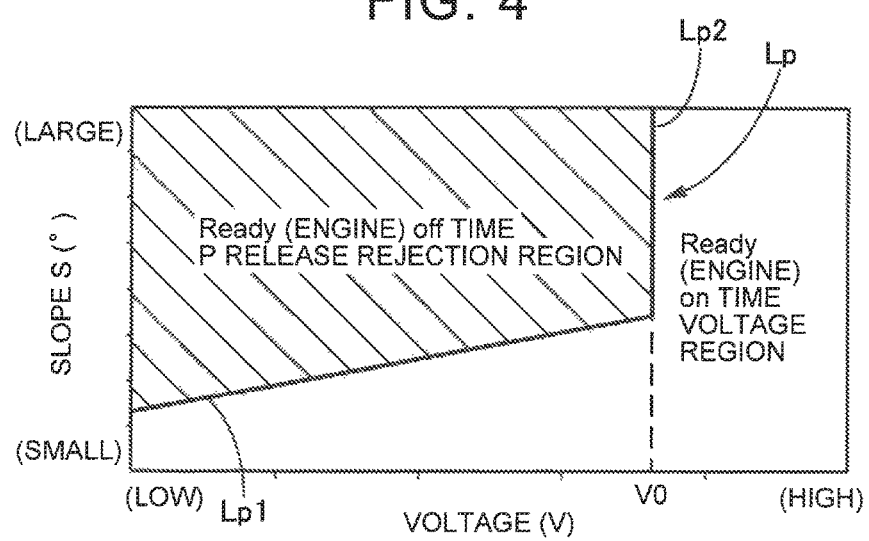
FIG. 4 is a P unreleasable region determination chart to determine a P unreleasable region (a READY-OFF time P release rejection region) or a P releasable region (a READY-OFF time P releasable region), that is, whether the P unreleasable region is established or not, when a power state of the vehicle is an IG-ON state (a READY-OFF state), the P unreleasable region determination chart being stored in the electronic control unit of FIG. 2.

The P unreleasable region determination portion 148 determines whether the road surface slope Sr at the vehicle position and the actual output voltage Volr of the auxiliary battery 66 fall within the predetermined P unreleasable region or not (whether the P release request rejection condition (c) is satisfied or not). FIG. 4 is a P unreleasable region determination chart for the P unreleasable region determination portion 148 to determine the P unreleasable region (a READY-OFF time P release rejection region) or a P releasable region (a READY-OFF time P releasable region), that is, to determine whether the P unreleasable region is established or not, at the time when the power state of the vehicle 10 is the IG-ON state (the READY-OFF state). The P unreleasable region determination chart of FIG. 4 is constituted by a two-dimensional coordinate in which a horizontal axis indicates an output voltage Vol (V) of the auxiliary battery 66 and a vertical axis indicates a road surface slope S (°), and is stored in the SBW-ECU 132 in advance. A P unreleasable region determination line Lp is constituted by a road surface slope boundary line Lp1 set so that the road surface slope S increases along with an increase of the output voltage Vol of the auxiliary battery 66, and a voltage boundary line Lp2 set so that the output voltage Vol of the auxiliary battery 66 indicates a predetermined voltage value V0. The P unreleasable region determination line Lp is indicated by a continuous line in FIG. 4. Note that a part of the voltage boundary line Lp2, which part does not belong to the P unreleasable region determination line Lp, is indicated by a broken line. Further, the road surface slope boundary line Lp1 is omitted in a voltage region higher than the voltage boundary line Lp2. The P unreleasable region (the READY-OFF time P release rejection region) is a region where the road surface slope S is larger than the road surface slope boundary line Lp1 and the output voltage Vol of the auxiliary battery 66 is lower than the voltage boundary line Lp2, and is a region indicated by oblique lines in FIG. 4. The road surface slope boundary line Lp1 is also a voltage slope boundary line Lp1 set so that the output voltage Vol of the auxiliary battery 66 increases along with an increase of the road surface slope S. In this case, the P unreleasable region can be also referred to as a region where the output voltage Vol of the auxiliary battery 66 is lower than the voltage slope boundary line Lp1, and the output voltage Vol of the auxiliary battery 66 is lower than the voltage boundary line Lp2. Here, the P unreleasable region is a region where, when the power state of the vehicle 10 is the IG-ON state (the READY-OFF state), the electric motor 50 might not be able to output a torque necessary for the P release, and a region (a P release rejection region) where the P release based on the P release request by the operation of the driver on the shift lever 44 is rejected. Further, the P releasable region where the P release is performable by driving of the electric motor 50 when the power state of the vehicle 10 is the IG-ON state is a region where the road surface slope S is smaller than the road surface slope boundary line Lp1 and the output voltage Vol of the auxiliary battery 66 is lower than the voltage boundary line Lp2. In other words, the P releasable region is a region where the output voltage Vol of the auxiliary battery 66 is higher than the voltage slope boundary line Lp1, and the output voltage Vol of the auxiliary battery 66 is lower than the voltage boundary line Lp2. Further, a region where the output voltage Vol of the auxiliary battery 66 is higher than the voltage boundary line Lp2, that is, the predetermined voltage value V0, is a voltage region of the auxiliary battery 66 charged by the alternator 76 driven by the engine 26, and a voltage region of the auxiliary battery 66 charged with a charging voltage obtained such that the voltage of the HV battery 74 is decreased by the DCDC converter 64. That is, the region is a voltage region (hereinafter referred to as a READY-ON time voltage region) at the time when the power state of the vehicle 10 is the READY-ON state. The P releasable region and the READY-ON time voltage region are regions that assure that a torque necessary for the P release can be output from the electric motor 50.

When all the P release request rejection conditions (a) to (d) are satisfied, the P release request rejection portion 142 turns on a P release request rejection flag. Further, when any of the P release request rejection conditions (a) to (d) is not satisfied, the P release request rejection portion 142 turns off the P release request rejection flag. The P release rejection condition determination portion 140 stores, in a determination result storage portion 143, a result on whether the P release request rejection flag is turned on or off based on a determination result on whether the P release request rejection conditions (a) to (d) are all satisfied or not.

When the power state of the vehicle 10 is the IG-ON state (the READY-OFF state) and the P release request determination portion 136 determines the P release request from the driver based on a result stored in the determination result storage portion 143 and indicating that the P release request rejection flag is turned on, the P release request rejection portion 142 rejects the P release request. That is, in a case where all the P release request rejection conditions (a) to (d) are satisfied, including a fact that the P unreleasable region determination portion 148 determines that the road surface slope Sr at the vehicle position and the output voltage Volr of the auxiliary battery 66 fall within the predetermined P unreleasable region (that the P release request rejection condition (e) is satisfied), the P release request rejection portion 142 rejects the P release request upon receipt of the P release request.

Further, in a case where the P release request rejection flag stored in the determination result storage portion 143 is turned on, when any of the P release request rejection conditions (a) to (d) is not satisfied, e.g., the slope signal abnormality determination portion 150 determines that the slope signal indicative of the road surface slope Sr is abnormal or slope information is not effective because the slope signal cannot be acquired from the slope sensor 70 (that the P release request rejection condition (b) is not satisfied), the P release request rejection portion 142 changes the P release request rejection flag from ON to OFF. That is, even in a case where the P unreleasable region determination portion 148 determines that the road surface slope Sr at the vehicle position and the actual output voltage Volr of the auxiliary battery 66 fall within the P unreleasable region (that the P release request rejection condition (c) is satisfied), when the road surface slope value shown by the slope signal detected by the slope sensor 70 is abnormal or when the slope sensor 70 is abnormal such that the slope signal cannot be acquired, the P release request rejection portion 142 does not reject the P release request at the time of receiving the P release request.

In the case where all the P release request rejection conditions (a) to (d) are satisfied, including the fact that the P unreleasable region determination portion 148 determines that the road surface slope Sr at the vehicle position and the output voltage Volr of the auxiliary battery 66 fall within the P unreleasable region (that the P release request rejection condition (c) is satisfied), when the P release request is received, the change request rejection notifying portion 146 outputs, via notifying means 152, a notice that the P release request has been rejected by the P release request rejection portion 142. Here, the notice that the P release request has been rejected may be a notice related to only a fact that the P release request has been rejected, may be a notice to encourage changing of the power state of the vehicle 10 from the IG-ON state to the READY-ON state that is the runnable state where the vehicle 10 can run, for example, or may be a notice to promote starting of the engine 26. When the driver changes the power state of the vehicle 10 from the IG-ON state to the READY-ON state in response to the notice from the notifying means 152, the auxiliary battery 66 is charged with an electric power generated by the alternator 76 driven by the engine 26, or the auxiliary battery 66 is charged with a voltage obtained such that the output voltage of the HV battery 74 is decreased by the DCDC converter 64. Hereby, the output voltage Vol of the auxiliary battery 66 enters the READY-ON time voltage region (illustrated in FIG. 4) i.e., becomes higher than the predetermined voltage value V0, thereby resulting in that the P release is performable.

When the P release request rejection portion 142 determines not to reject the P release, the parking lock control portion 144 changes the electric motor relay 51 to an ON state so as to establish a state where the electric motor 50 is drivable by an electric power from the auxiliary battery 66. Then, the electric motor 50 is driven to perform the P release based on the P release request from the driver.

When the P release request is rejected by the P release request rejection portion 142, the electric actuator failure determination portion 138 does not determine that the electric motor 50 has a failure, based on the fact that the P release is not performed in response to the P release request. This accordingly restrains an occurrence of such a wrong determination of an electric motor failure that the electric motor 50 is wrongly determined to have a failure though the electric motor 50 does not have a hardware failure.

Figure 5:
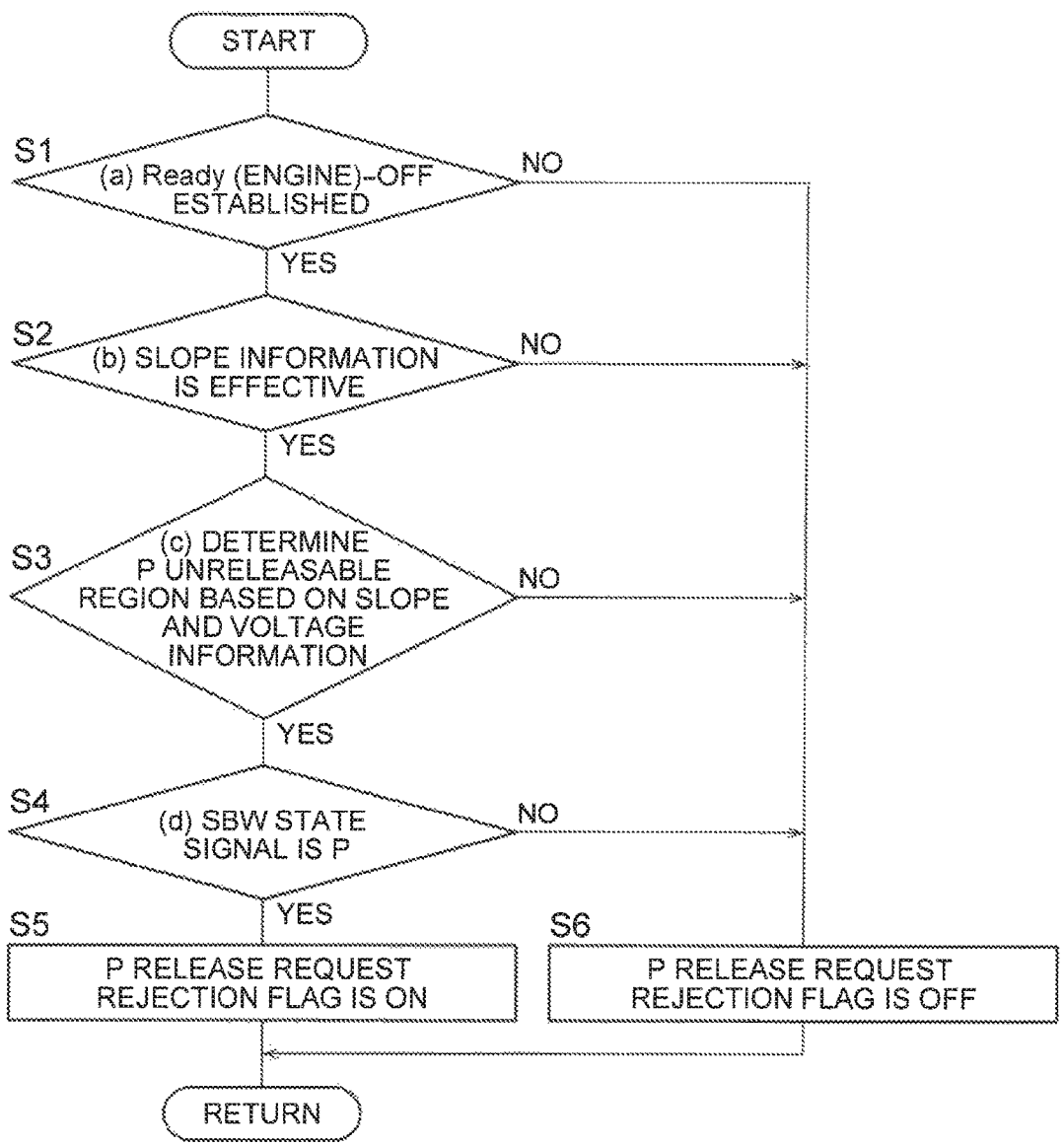
FIG. 5 is a flowchart to describe an essential part of a control operation of a SBW-ECU in the electronic control unit of FIG. 2.
Figure 6:
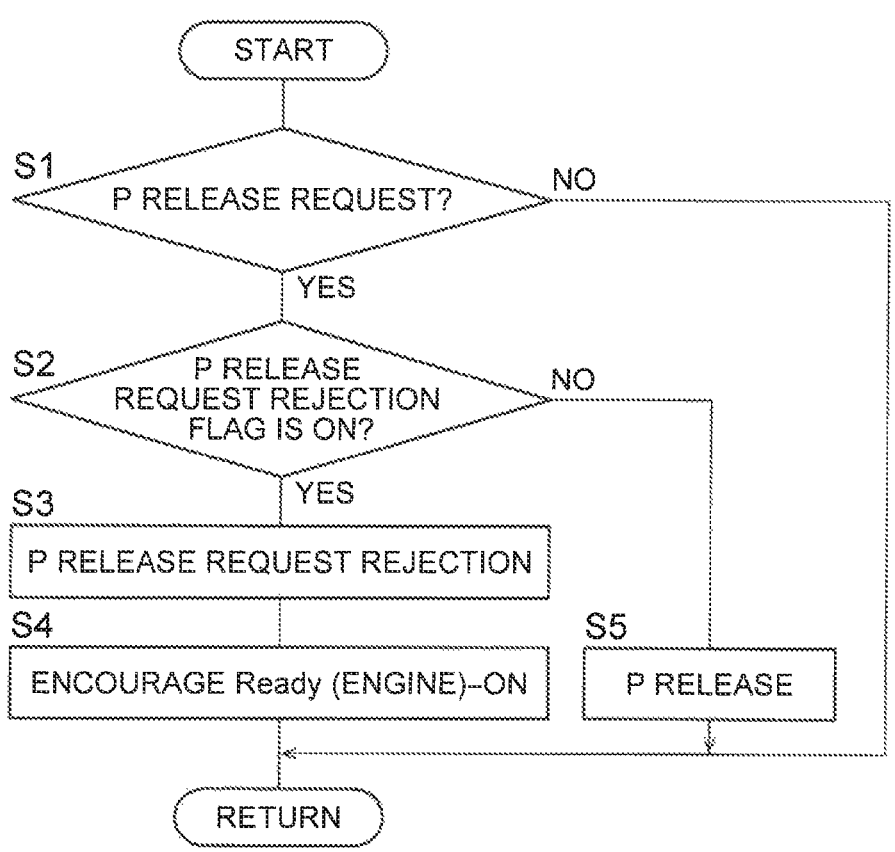
FIG. 6 is a flowchart to describe an essential part of the control operation of the SBW-ECU in the electronic control unit of FIG. 2.

FIGS. 5 and 6 are flowcharts to describe an essential part of the control operation of the SBW-ECU 132, and are performed when the power state of the vehicle 10 is the IG-ON state (the READY-OFF state). FIGS. 7 and 8 are time charts to describe an exemplary operation of the control operation of the SBW-ECU 132 when the power state of the vehicle 10 is the IG-ON state (the READY-OFF state).

In FIGS. 7 and 8, the power state of the vehicle 10 is changed to the IG-ON state (the READY-OFF state) (a time t1), so that the SBW-ECU 132 is started. Then, at a communication start time at which communications with another control device and the like is started, that is, at a substantial power-on time (a time t2) after a predetermine time has elapsed from the time (the time t1) of the change to the IG-ON state, it is determined whether the power state of the vehicle 10 is a READY (engine)-OFF state or not (whether the P release request rejection condition (a) is satisfied or not) in step S1 (hereinafter "step" is omitted) corresponding to a function of the P release rejection condition determination portion 140 in FIG. 5. When the determination of S1 is affirmed (at the time t2 in FIGS. 7 and 8), it is determined whether slope information is effective or not (whether the P release request rejection condition (b) is satisfied or not), in S2 corresponding to a function of the slope signal abnormality determination portion 150 of the P release rejection condition determination portion 140. When the determination of S2 is affirmed (at the time t2 in FIGS. 7 and 8), it is determined whether a road surface slope Sr at a vehicle position and an output voltage Volr of the auxiliary battery 66 full within the predetermined P unreleasable region or not (whether the P release request rejection condition (c) is satisfied or not), in S3 corresponding to a function of the P unreleasable region determination portion 148 of the P release rejection condition determination portion 140. When the determination of S3 is affirmed (at the time t2 in FIGS. 7 and 8), it is determined whether the shift change mechanism 40 is in the parking lock state or not, that is, whether the shift position is positioned at the P position or not, based on a SBW status signal from the shift sensor 54 (whether the P release request rejection condition (d) is satisfied or not), in S4 corresponding to a function of the P release rejection condition determination portion 140. When the determination of 54 is affirmed (at the time t2 in FIGS. 7 and 8), the P release request rejection flag is turned on (at the time t2 of FIGS. 7 and 8), in S5 corresponding to a function of the P release request rejection portion 142. After the execution of S5, this flowchart is finished. When any of the determinations from S1 to S4 is disaffirmed, the P release request rejection flag is turned off (at a time t3 in FIG. 8) in S6 corresponding to the function of the P release request rejection portion 142. At the time t3 in FIG. 8, a slope signal from the slope sensor 70 has an abnormality and the slope signal abnormality determination portion 150 determines that slope information is invalid, so that the P release request rejection portion 142 changes the P release request rejection flag from ON to OFF. That is, even in a case where the P unreleasable region determination portion 148 determines that the road surface slope Sr at the vehicle position and the output voltage Vol of the auxiliary battery 66 fall within the P unreleasable region, when the slope signal is abnormal or the slope signal cannot be acquired, the P release request is not rejected. After the execution of S6, this flowchart is finished.

In S1 corresponding to a function of the P release request determination portion 136 in FIG. 6, it is determined whether the P release request from the driver is received or not. When the determination of S1 is disaffirmed, this flowchart is finished. When the determination in S1 is affirmed, it is determined whether the P release request rejection flag is turned on or not, in S2 corresponding to the function of the P release request rejection portion 142. When the determination in S2 is affirmed, the P release request is rejected in S3 corresponding to the function of the P release request rejection portion 142. In S4 corresponding to a function of the change request rejection notifying portion 146, a notice to promote changing of the power state of the vehicle 10 from the IG-ON state (the READY-OFF state) to the READY-ON state or starting of the engine 26 is output via the notifying means 152. After the execution of 84, this flowchart is finished. In the meantime, when the determination in S2 is disaffirmed, the P release is performed in response to the P release request from the driver in S5 corresponding to a function of the parking lock control portion 144. After the execution of S5, this flowchart is finished.

As described above, the SBW-ECU of the present embodiment includes: the P unreleasable region determination portion 148 configured to determine whether the road surface slope Sr at the vehicle posit ion and the output voltage Volr of the auxiliary battery 66 fall within the predetermined parking lock unreleasable region or not; and the P release request rejection portion 142 configured such that, in a case where all the P release request rejection conditions (a) to (d) are satisfied, including a fact that the P unreleasable region determination portion 148 determines that the road surface slope Sr at the vehicle position and the output voltage Volr of the auxiliary battery 66 fall within the P unreleasable region (that the P release request rejection condition (c) is satisfied), the P release request rejection portion 142 turns on the P release request rejection flag, and rejects the P release request upon receipt of the P release request. On this account, in a case where the electric motor 50 might not be able to output an output torque necessary to perform the P release, the P release request from the driver is rejected. Hereby, in the IG-ON state where the auxiliary battery 66 for supplying an electric power to the electric motor 50 might not be charged and its output voltage Volr might enter a low voltage state, it is possible to restrain the electric motor 50 from being wrongly determined to have a failure.

Further, the SBW-ECU 132 of the present embodiment includes the change request rejection notifying portion 146 configured to output a notice that the P release request has been rejected, in a case where the P unreleasable region determination portion 148 determines that the road surface slope Sr at the vehicle position and the output voltage Volr of the auxiliary battery 66 fall within the P unreleasable region. On this account, in a case where the power state of the vehicle 10 that has a possibility that the output voltage Volr of the auxiliary battery 66 for supplying an electric power to the electric motor 50 might enter the low voltage state is the IG-ON state, the notice that the P release request has been rejected is notified at the time when the P release request has been rejected.

Further, according to the SBW-ECU 132 of the present embodiment, the P unreleasable region is a region where, in a two-dimensional coordinate including an axis indicative of the output voltage Vol of the auxiliary battery 66 and an axis indicative of the road surface slope S, the road surface slope S is larger than the road surface slope boundary line Lp1 set so that the road surface slope S increases along with the increase of the output voltage Vol of the auxiliary battery 66, and the output voltage Vol of the auxiliary battery 66 is lower than the voltage boundary line Lp2 set so that the output voltage Vol of the auxiliary battery 66 indicates the predetermined voltage value V0. Alternatively, it can be said that the P unreleasable region is a region where the output voltage Vol of the auxiliary battery 66 is lower than the voltage slope boundary line Lp1 set so that the output voltage Vol of the auxiliary battery 66 increases along with the increase of the road surface slope S, and the output voltage Vol of the auxiliary battery 66 is lower than the voltage boundary lure Lp2. On this account, when the actual output voltage Volr of the auxiliary battery 66 is lower than the predetermined voltage value V0 and the actual road surface slope Sr is larger than a road surface slope determined based on the actual output voltage Volr of the auxiliary battery 66 from the road surface slope boundary line Lp1, the P release request is rejected. Alternatively, when the actual output voltage Vol of the auxiliary battery 66 is lower than the voltage boundary line Lp2 set so as to indicate the predetermined voltage value V0 and also the actual output voltage Vol of the auxiliary battery 66 is lower than an output voltage Vol of the auxiliary battery 66, determined from the road surface slope Sr at the vehicle position based on the voltage boundary line Lp2, a change request from the driver to change from the parking lock state of the non-parking lock state is rejected. Hereby, it is possible to appropriately restrain the electric motor 50 from being wrongly determined to have a failure in a slope road.

Further, in terms of the SBW-ECU 132 of the present embodiment, the vehicle 10 includes: the HV battery 74 with a voltage higher than the auxiliary battery 66; and the DCDC converter 64 configured to decrease the output voltage of the HV battery 74 to the charging voltage for the auxiliary battery 66 at the time when the power state is a state where the vehicle can run, i.e., the READY-ON state. The READY-ON time voltage region where the output voltage Vol of the auxiliary battery 66 is higher than the voltage boundary line Lp2 is a voltage region of the auxiliary battery 66 charged with the charging voltage decreased by the DCDC converter 64. On this account, at the time when the power state of the vehicle 10 in which the auxiliary battery 66 is charged with the charging voltage obtained such that the output voltage of the HV battery 74 is decreased by the DCDC converter 64 is the READY-ON state, the P release request is not rejected.

Further, in the SBW-ECU 132 of the present embodiment, the change request rejection notifying portion 146 performs notification to promote changing to the READY-ON state, which is a power state where the vehicle running is performable. On this account, in a case where the power state of the vehicle 10 that has a possibility that the output voltage Volr of the auxiliary battery 66 for supplying an electric power to the electric motor 50 might enter the low voltage state is the IG-ON state, when the P release request is rejected, the driver is promoted to perform the changing to the READY-ON state where the vehicle running is performable.

Further, in terms of the SBW-ECU 132 of the present embodiment, the vehicle 10 includes the alternator 76 rotationally driven by the engine 26, and the region where the output voltage Vol of the auxiliary battery 66 is higher than the voltage boundary line Lp2 is a voltage region of the auxiliary battery 66 charged by the alternator 76. Accordingly, in the READY-ON state where the auxiliary battery 66 is charged with an electric power generated by the alternator 76, the change request from the driver to change from the parking lock state to the non-parking lock state is not rejected.

Further, in the SBW-ECU 132 of the present embodiment, the change request rejection notifying portion 146 performs notification to promote starting of the engine 26. On this account, in the READY-ON state where the output voltage Vol of the auxiliary battery 66 for supplying an electric power to the electric motor 50 might enter the low voltage state, when the P release request from the driver is rejected, the driver is promoted to perform the staring of the engine 26.

Further, in terms of the SBW-ECU 132 of the present embodiment, the slope sensor 70 for detecting the road surface slope Sr of the vehicle position is provided. In a case where a road surface slope value shown by a slope signal detected by the slope sensor 70 is abnormal, for example, or at the time when the slope sensor 70 is abnormal such that the slope signal cannot be acquired from the slope sensor 70, for example, even if the P unreleasable region determination portion 148 determines that the road surface slope Sr at the vehicle position and the output voltage Volr of the auxiliary battery 66 fall within the P unreleasable region (the P release request rejection condition (c) is satisfied), the P release request rejection portion 142 changes the P release request rejection flag from ON to OFF, and does not reject the P release request at the time of receiving the P release request. On this account, in a case where the slope signal indicative of a road surface slope value Sr is abnormal or the slope signal cannot be acquired from the slope sensor 70, it is possible to restrain such a situation that the P release request is wrongly rejected when the vehicle 10 is on a flat road with a small road surface slope Sr and the electric motor 50 can output a torque necessary to change from the parking lock state to the non-parking lock state, for example.

The present disclosure has been described in detail with reference to the table and the drawings, but the present disclosure can be performed with further another embodiment, and various modifications can be added thereto without departing from the gist of the present disclosure.

For example, the vehicle 10 of the above embodiment is a hybrid vehicle, and includes the alternator 76 rotationally driven by the engine 26, and the DCDC converter 64 configured to decrease an output voltage of the HV battery 74 (the output voltage is higher than that of the auxiliary battery 66) to a charging voltage for the auxiliary battery 66. Further, the READY ON time voltage region is a voltage region of the auxiliary battery 66 charged with an electric power generated by the alternator 76, or a voltage region of the auxiliary battery 66 charged with a charging voltage decreased by the DCDC converter 64. However, the present disclosure is not limited to this. For example, an electrically-driven vehicle that does not include an engine as a drive source may include a HV battery with a voltage higher than an auxiliary battery, and a DCDC converter configured to decrease an output voltage of the HV battery to a charging voltage for the auxiliary battery in a power state where the vehicle can run. In such an electrically-driven vehicle, a READY-ON time voltage region in a P unreleasable region determination chart preset in a SBW-ECU may be a voltage region of the auxiliary battery charged with the charging voltage decreased by the DCDC converter. A change request rejection notifying portion may be configured such that, in a case where it is determined that P release request rejection conditions (a) to (d) are all satisfied, the change request rejection notifying portion outputs a notice to promote changing a power state of the vehicle to a vehicle runnable state, i.e., an READY-ON state, at the time of receiving a P release request. Further, in a so-called engine vehicle including only an engine as a drive source, an alternator rotationally driven by the engine may be provided, a READY-ON time voltage region in a P unreleasable region determination chart preset in a SBW-ECU may be a voltage region of an auxiliary battery charged with an electric power generated by the alternator with a power of the engine, and a change request rejection notifying portion may be configured such that, in a case where it is determined that the P release request rejection conditions (a) to (d) are all satisfied, when a P release request is received, the change request rejection notifying portion outputs a notice to promote starting of the engine.

Further, in the above embodiment, when the power state of vehicle 10 is the IG-ON state and the P release rejection condition determination portion 140 determines that the P release request rejection conditions (a) to (d) are all satisfied, the P release request is rejected by the P release request rejection portion 142. However, the present disclosure is not limited to this. For example, in a case where the P unreleasable region determination portion 148 determines that the road surface slope Sr at the vehicle position and the output voltage Volr of the auxiliary battery 66 fall within the predetermined P unreleasable region (the P release request rejection condition (c) is satisfied), the P release request rejection portion 142 may turn off the P release request rejection flag, so that the P release request is rejected.

Further, in the above embodiment, the P unreleasable region determination portion 148 determines that the P release request rejection condition (c) is satisfied when a point indicative of the output voltage Volr and the slope Sr is positioned in the READY-OFF time P release rejection region in the predetermined two-dimensional coordinate illustrated in FIG. 4. However, the P unreleasable region determination portion 148 may determine that the P release request rejection condition (c) is satisfied, when the actual output voltage Volr and the slope Sr are positioned within respective predetermined one-dimensional regions for the output voltage Vol and the slope S.

Further, in the above embodiment, the electric motor 50 configured to change the shift change mechanism 40 between the parking lock state and the non-parking lock state uses, as a power supply, the auxiliary battery 66 serving as the first power supply and functioning as the first storage battery. However, the power supply for the electric motor 50 is not limited to this, provided that the power supply can output, to the electric motor 50, an output voltage that can change the shift change mechanism 40 from the parking lock state to the non-parking lock state and the power supply is rechargeable. The electric motor 50 may use a capacitor, a fuel cell, and the like as the power supply.

The above embodiment is merely one embodiment, and other embodiments are not exemplified in detail. However, the present disclosure can be performed in an embodiment to which various changes and improvements are added based on the knowledge of a person skilled in the art without departing the gist thereof.

What is claimed is:

1. A parking lock control device for a vehicle,
the parking lock control device being configured to change a parking lock mechanism to a non-parking lock state by an electric actuator using a first power supply as a power supply, in response to a change request to change a state from a parking lock state to the non-parking lock state,
the parking lock control device comprising
an electronic control unit configured to
determine whether a road surface slope at a vehicle position and an output voltage of the first power supply are within a predetermined parking lock unreleasable region or not, and
reject the change request when the electronic control unit determines that the road surface slope at the vehicle position and the output voltage of the first power supply are within the parking lock unreleasable region.

2. The parking lock control device according to claim 1, wherein
the electronic control unit is configured to output a notice that the change request has been rejected, when the electronic control unit determines that the road surface slope at the vehicle position and the output voltage of the first power supply are within the parking lock unreleasable region.

3. The parking lock control device according to claim 2, wherein
the first power supply is a first storage battery;
the vehicle includes a second storage battery having a voltage higher than the first storage battery and provided as a second power supply, and a direct current voltage converter configured to decrease an output voltage of the second storage battery to a charging voltage of the first storage battery in a power state where vehicle running is performable; and
the electronic control unit is configured to perform notification to promote changing to the power state where the vehicle running is performable.

4. The parking lock control device according to claim 2, wherein the first power supply is a first storage battery;
the vehicle includes a generator rotationally driven by an engine; and
the electronic control unit is configured to perform notification to promote starting of the engine.

5. The parking lock control device according to claim 1, wherein
in a two-dimensional coordinate including an axis indicative of the output voltage of the first power supply and an axis indicative of the road surface slope, the parking lock unreleasable region is either one of the following regions:
a region where the road surface slope is larger than a road surface slope boundary line set so that the road surface slope increases along with an increase of the output voltage of the first power supply, and the output voltage of the first power supply is lower than a voltage boundary line set so that the output voltage of the first power supply indicates a predetermined voltage value; and
a region where the output voltage of the first power supply is lower than a voltage slope boundary line set so that the output voltage of the first power supply increases along with an increase of the road surface slope, and the output voltage of the first power supply is lower than the voltage boundary line.

6. The parking lock control device according to claim 5, wherein:
the first power supply is a first storage battery;
the vehicle includes a second storage battery having a voltage higher than the first storage battery and provided as a second power supply, and a direct current voltage converter configured to decrease an output voltage of the second storage battery to a charging voltage of the first storage battery in a power state where vehicle running is performable; and
a region where the output voltage of the first storage battery is higher than the voltage boundary line is a voltage region of the first storage battery charged with the charging voltage decreased from the output voltage of the second storage battery by the direct current voltage converter.

7. The parking lock control device according to claim 5, wherein
the first power supply is a first storage battery;
the vehicle includes a generator rotationally driven by an engine; and
a region where the output voltage of the first storage battery is higher than the voltage boundary line is a voltage region of the first storage battery charged by the generator.

8. The parking lock control device according to claim 1, further comprising:
a slope sensor configured to detect the road surface slope at the vehicle position, wherein
in a case where a road surface slope value detected by the slope sensor is abnormal or the slope sensor is abnormal, even if the electronic control unit determines that the road surface slope at the vehicle position and the output voltage of the first storage battery are within the parking lock unreleasable region, the electronic control unit is configured not to reject the change request.

* * * * *